April 15, 1952  W. SELOVE  2,592,750
IMPEDANCE METER
Filed May 3, 1946
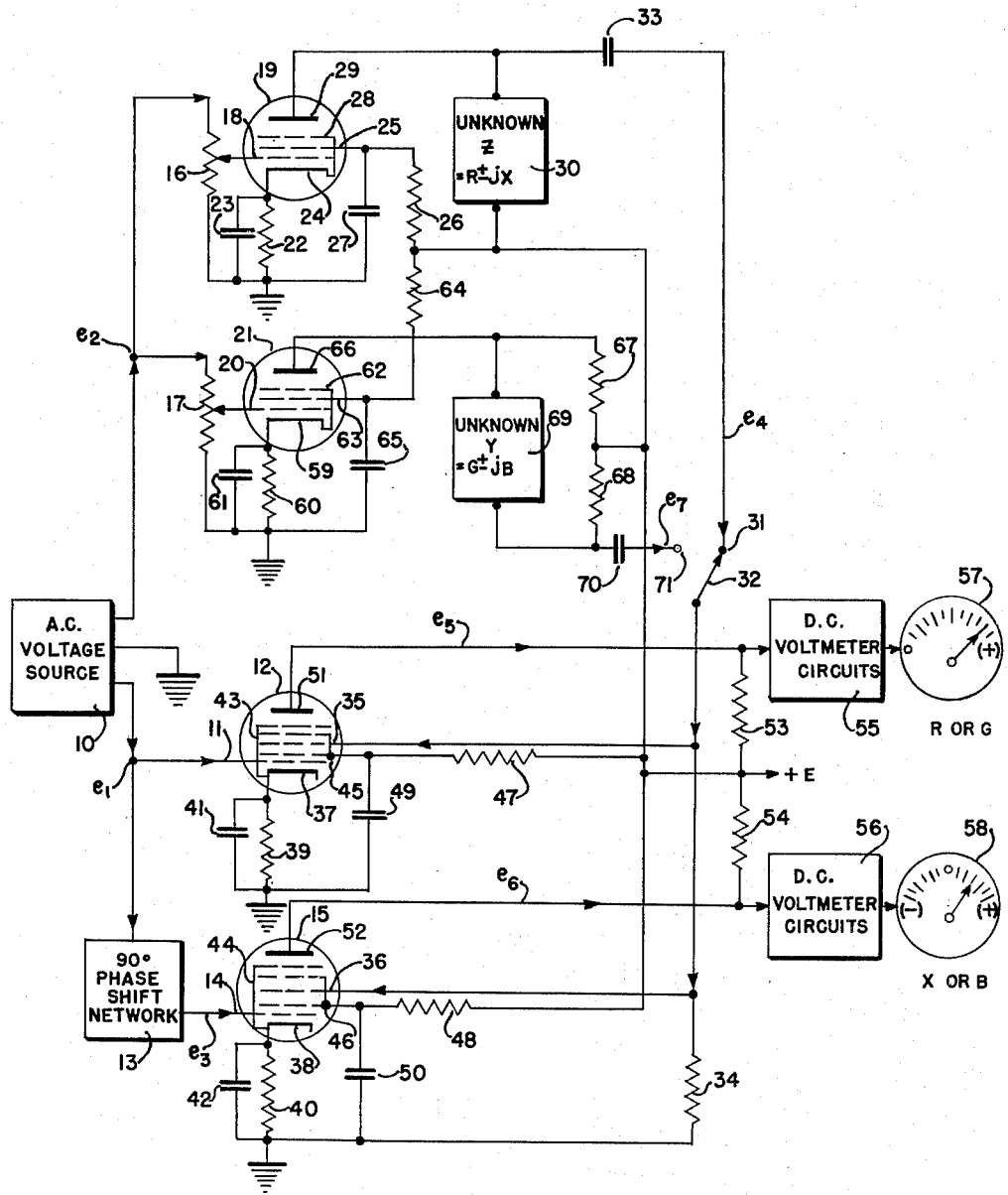
INVENTOR
WALTER SELOVE
BY
ATTORNEY Patented Apr. 15, 1952

2,592,750

UNITED STATES PATENT OFFICE 2,592,750

IMPEDANCE METER

Walter Selove, Chicago, Ill., assignor, by mesne assignments, to the United States of America as represented by the Secretary of the Navy Application May 3, 1946, Serial No. 666,883

3 Claims. (Cl. 175—183)

This invention relates in general to measuring devices and in particular to electronic impedance measuring devices.

This invention is applicable in general for measuring a complex impedance or admittance and in particular for measuring the resistive and reactive components of a complex impedance or the conductive and susceptive components of a complex admittance.

The primary object of this invention is to provide apparatus which directly indicates the values of the real and imaginary parts of a complex impedance or admittance.

Other and further objects of this invention will become apparent from the following specifications when taken with the accompanying drawing which is a schematic diagram of an embodiment of this invention.

Referring to the drawing, source 10 of alternating voltage is so constructed that two voltages are available, one 180° out of phase with respect to the other. These voltages are designated:

$$e_1 = k_1 \sin wt$$
and
$$e_2 = -k_2 \sin wt$$

where the various $k$'s used in these equations and in the equations following are constants which depend upon the particular circuit components used in the construction of this apparatus, and $wt$ is the time rate of change of voltage. Voltage $e_1$ is applied to control grid 11 of mixer tube 12 and is also applied to phase shifter 13 which shifts $e_1$ 90° in phase. The voltage output $e_3$ of phase shifter 13 is:

$$e_3 = k_3 \cos wt$$

and this voltage is applied to control grid 14 of mixer tube 15.

Voltage $e_2$ is applied to variable attenuators 16 and 17 and the output voltages from these attenuators are applied respectively to control grid 18 of tube 19 and to control grid 20 of tube 21. The circuit containing tube 19 is used for measuring unknown impedances in terms of equivalent series components and the circuit containing tube 21 is used for measuring unknown admittances in terms of equivalent parallel components. Tube 19 is preferably of the pentode type and is connected as a standard amplifier tube with bias resistor 22 and condensor 23 connected to cathode 24, screen grid 25 energized through resistor 26 and by-passed by condenser 27, suppressor grid 28 connected to the cathode, and plate 29 energized through unknown impedance 30. For proper operation unknown impedance 30 must have a value permitting tube 19 to have control over the flow of current through said impedance. Under the condition of constant current from tube 19, the current flowing through impedance 30 will be independent of that impedance, and therefore the voltage across the impedance will be proportional to the impedance. Thus the voltage $e_4$ at contact 31 of switch 32 will have a component 180° out of phase with $e_2$ which is proportional to R of impedance 30, and a component 90° out of phase with $e_2$ which is proportional to X of impedance 30. This voltage is given by the relation $$e_4 = k_4 R \sin wt \pm k_5 X \cos wt$$

Condenser 33 is used as a blocking condenser to remove the D. C. component that would normally be present in $e_4$ and the magnitudes of condenser 33 and resistor 34 are made such that the phase shift produced by them is negligible by making resistor 34 large compared to the magnitude of $R+jX$. The arm of switch 32 is connected to mixer grids 35 and 36 of mixer tubes 12 and 15 respectively and resistor 34 supplies the D. C. return for these grids.

Mixer tubes 12 and 15 and their associated circuits are identical except for the difference in input voltages $e_1$ and $e_3$, and consequently there is a difference in output voltages $e_5$ and $e_6$. Mixer tubes 12 and 15 may be mixer tubes of the pentagrid type as shown and are connected in the circuit in a conventional manner with the cathodes 37 and 38 biased by resistors 39 and 40 and condensers 41 and 42, grids 43 and 44 connected to their respective cathodes, grids 45 and 46 energized through resistors 47 and 48 and by-passed by condensers 49 and 50, plates 51 and 52 energized through load resistors 53 and 54, and the control grids energized and connected as previously explained.

For the following relations to hold true, the magnitudes of resistances 53 and 54 must be small compared to the plate resistances of tubes 12 and 15. For small incremental voltages $e_1$ and $e_4$ on grids 11 and 35 respectively of tube 12, the plate current $i_p$ of tube 12 is given by $$i_p = (k_6 + k_7 e_1)(k_8 + k_9 e_4)$$

or $$i_p = k_{10} + k_{11} e_1 + k_{12} e_4 + k_{13} e_1 e_4$$

where $$k_{10} = k_6 k_8, \quad k_{11} = k_7 k_8, \quad k_{12} = k_6 k_9$$

and $$k_{13} = k_7 k_9$$

Substituting the previous values for $e_1$ and $e_4$, the plate current $i_p$ becomes:

$$i_p = k_{10} + k_{14} \sin wt \pm k_{15}R \sin wt \pm k_{16}X \cos wt + k_{17}R \sin^2 wt \pm k_{18}X \sin 2wt$$

where $k_{14}$ to $k_{18}$ are combinations of previous $k$'s. Expanding the term containing $\sin^2 wt$ to its equivalent $\frac{1}{2}(1-\cos 2wt)$ and averaging the current over a period of time long compared to $$\frac{1}{w}$$

the average plate current of tube 12 becomes:

$$(i_p) \text{ ave.} = k_{10} + \frac{k_{17}R}{2}$$

Similarly it can be shown that the average plate current $(i_{p2})$ ave. flowing in tube 15 when $e_3$ and $e_4$ are impressed on the control grids is given by the relation $$(i_{p2}) \text{ ave.} = k_{19} \pm \frac{k_{20}X}{2}$$

where the $k$'s are constants obtained as previously described.

It is readily apparent that any change in the average plate voltage $e_5$ of tube 12 is caused entirely by the resistive component of impedance 30 and is directly proportional thereto and any change in the average plate voltage $e_6$ of tube 15 is caused entirely by the reactive component of impedance 30 and is directly proportional thereto. D. C. voltmeter circuits 55 and 56 are constructed to average the voltage from the plates of tubes 12 and 15 respectively. Meter 57 is then calibrated in resistance units and meter 58 is calibrated to read positive or negative reactance, and thus a direct reading of the real and imaginary components of impedance 30 is obtained.

As stated previously, the relations described above hold only for values of impedances which permit the operation of pentode 19 in the constant current portion of its plate current versus plate voltage characteristic. A different circuit is employed to measure impedances of large magnitude which would change the operation conditions of tube 19 so that the plate current of the tube is no longer independent of plate voltage. Here the circuits of tube 21 are employed. Tube 21 has its control grid energized as stated previously by voltage $e_2$ through attenuator 17, cathode 59 is biased by resistor 60 and condenser 61, grid 62 is connected to the cathode, grid 63 is energized through resistor 64 and by-passed by condenser 65, and plate 66 is energized by the parallel combination of resistor 67, resistor 68 and unknown impedance 69 (here measured as an admittance which is the reciprocal of the impedance). For proper operation of this circuit admittance 69 must have an absolute magnitude much smaller than the reciprocal of the sum of resistors 67 and 68, that is $$|Y| \ll \frac{1}{R_{67}+R_{68}}$$

and resistor 67 must be smaller than the plate resistance of tube 21. When these relations are true, the voltage across admittance 69 is determined by the magnitude of $R_{67}$ and is independent of the admittance. Therefore the current through the admittance is proportional to the admittance, having a component 180° out of phase with $e_2$ which is proportional to G and a component 90° out of phase with $e_2$ which is proportional to B. This current flowing through resistor 68 produces a voltage $e_7$ which has components proportional to the conductance and susceptance of admittance 69, that is:

$$e_7 = k_{21}G \sin wt \pm k_{22}B \cos wt$$

Condenser 70 is used only to remove the D. C. component of voltage as was condenser 33 of the previous circuit. When switch arm 32 is at contact 71, the voltage $e_7$ is applied to grids 35 and 36 of tubes 12 and 15 respectively and, as before, meter 57 records the resistive component of the voltage and meter 58 records the reactance component of the voltage.

It is readily apparent that other types of tubes with various other connections can be used and still be within the scope of this invention. This invention is not to be limited to the above details but is to be limited only by the following claims.

What is claimed is:

1. Apparatus for determining the effective resistance and reactance components of a complex impedance comprising, a source of alternating current power, a multigrid electron tube biased from said source to operate with an alternating output current of constant effective value, means for connecting said impedance in the output circuit of said tube, thereby producing a voltage in phase with said current proportional to the effective resistance of said impedance and a voltage in quadrature with the phase of said current proportional to the reactance of said impedance, a second multigrid electron tube responsive directly to a voltage from said source and to the in-phase voltage component of said impedance to produce an output voltage proportional to said resistance component of said impedance, a phase shifting network, and a third multigrid electron tube responsive directly to a voltage in quadrature from said phase shifting network and to the quadrature voltage of said impedance to produce an output voltage proportional to the reactance component of said complex impedance.

2. Apparatus for determining the effective resistance and reactance components of a complex impedance comprising, a source of alternating current power, a multigrid electron tube biased from said source to operate with an alternating output current of constant effective value, means for connecting said impedance in the output circuit of said tube, thereby producing a voltage in phase with said current proportional to the effective resistance of said impedance and a voltage in quadrature with the phase of said current proportional to the reactance of said impedance, a second multigrid electron tube responsive directly to a voltage from said source and to the in-phase voltage component of said impedance to produce an output voltage proportional to said resistance component of said impedance, a phase shifting network energized from said source, and a third multigrid electron tube responsive directly to a voltage from said phase shifting network in quadrature with the voltage of said source and to the quadrature voltage of said impedance to produce an output voltage proportional to the reactance component of said complex impedance.

3. Apparatus for determining the effective resistance and reactance components of a complex impedance comprising, a source of alternating current power, a multigrid electron tube biased from said source to operate with an alternating output current of constant effective value, means for connecting said impedance in the output circuit of said tube, thereby producing a voltage in phase with said current proportional to the effective resistance of said impedance and a voltage in quadrature with the phase of said current proportional to the reactance of said impedance, means for obtaining in-phase and quadrature voltages from said source, a second multigrid electron tube responsive directly to in-phase voltages from said source and from the output circuit of said first-named electron tube to produce unidirectional output voltages proportional to said resistance component of said impedance and a third multigrid electron tube responsive directly to said quadrature voltages from said source and from the output circuit of said first-named electron tube to produce a unidirectional output voltage proportional to said reactance component of said impedance, and means for indicating the magnitudes of each of said unidirectional output voltages in terms of said components of said impedance.

WALTER SELOVE.

REFERENCES CITED

The following references are of record in the file of this patent:

UNITED STATES PATENTS

| Number | Name | Date |
| --- | --- | --- |
| 2,111,235 | Avins | Mar. 15, 1938 |
| 2,273,066 | Povey et al. | Feb. 17, 1942 |
| 2,316,153 | Brown | Apr. 13, 1943 |
| 2,470,412 | Piety | May 17, 1949 |

OTHER REFERENCES

Electronics, May 1943, pages 86–88, 176 and 178.